United States Patent
Hagmanns

Patent Number: 5,852,641
Date of Patent: Dec. 22, 1998

[54] METHOD FOR CARRIER-FREQUENCY SYNCHRONIZATION

[75] Inventor: Franz-Josef Hagmanns, Backnang, Germany

[73] Assignee: Robert Bosch GmbH, Stuttgart, Germany

[21] Appl. No.: 750,351

[22] PCT Filed: Jun. 3, 1995

[86] PCT No.: PCT/DE95/00729

§ 371 Date: Dec. 9, 1996

§ 102(e) Date: Dec. 9, 1996

[87] PCT Pub. No.: WO95/34961

PCT Pub. Date: Dec. 21, 1995

[30] Foreign Application Priority Data

Jun. 10, 1994 [DE] Germany .................. 44 20 283.0

[51] Int. Cl.⁶ .................................................. H04L 7/00
[52] U.S. Cl. .................. 375/356; 375/356; 375/364; 375/362; 455/502; 455/503
[58] Field of Search .................. 375/206, 201, 375/204, 326, 200, 208, 281, 235, 344, 362, 354, 356, 364; 370/207, 307, 208, 479; 455/503

[56] References Cited

U.S. PATENT DOCUMENTS

| | | | |
|---|---|---|---|
| 4,719,619 | 1/1988 | Crookshanks | 370/70 |
| 5,444,697 | 8/1995 | Leung et al. | 370/19 |
| 5,521,937 | 5/1996 | Kondo et al. | 375/206 |

OTHER PUBLICATIONS

Binham, Multicarrier Modulation for Data Transmission, IEEE Communication Magazine, 5–14, May 1990.

Couch, Digital and Analog Communication Systems, Macmillan Publishing Company, 405, 1990.

*Primary Examiner*—Stephen Chin
*Assistant Examiner*—Shuwang Liu
*Attorney, Agent, or Firm*—Spencer & Frank

[57] ABSTRACT

A method of synchronizing carrier frequencies in a mobile radio network having base and mobile stations, in which a synchronization signal is radiated from the base stations, is received by the mobile stations and is used to derive the transmission frequency.

A group of sinusoidal oscillations having different frequencies is emitted from each base station as a synchronization signal. The mobile stations each have a matched filter, with which at least one of the transmitted sinusoidal oscillations can be found and detected.

The method is insensitive to fading, and permits an extensive normalization of the circuits in the base stations and, in particular, permits a unified evaluation in the mobile stations.

13 Claims, 2 Drawing Sheets

METHOD FOR CARRIER-FREQUENCY SYNCHRONIZATION

BACKGROUND OF THE INVENTION

Digital communications systems usually require a synchronization of the carrier oscillators in the transmitter and receiver. Two types of reception are: coherent reception: the carrier oscillators in the transmitter and receiver should be as phase-synchronized as possible; and incoherent reception: the carrier oscillators in the transmitter and receiver do not need to be phase-synchronized, but the phase difference between the two carrier oscillators should not vary too greatly with time, that is, the two carrier oscillators should be as frequency-synchronized as possible.

The present invention relates to the second case, that is, the synchronization of carrier frequencies between the transmitter oscillator and the receiver oscillator. It must be pointed out, however, that the present invention can also be of great significance for coherent transmission methods; the carrier phase synchronization is often performed in two steps: first, carrier frequency synchronization is performed in an attempt to keep the carrier phase difference between the transmitter oscillator and receiver oscillator as constant as possible so that the carrier phase difference can eventually be eliminated in a second step.

In many communications systems, particularly in mobile radio systems, carrier frequency synchronization is supported by special transmission signals. In the mobile radio system specified by GSM [1], for example, the base stations radiate a sinusoidal oscillation (hereinafter called "sinusoidal tone") that is constant with respect to frequency; this tone is electromagnetically radiated either continuously or intermittently. The mobile stations use this sinusoidal tone in receiver-side carrier frequency synchronization. The mobile stations are additionally required to derive their transmitter-side carrier frequency from the synchronized reception frequency. This automatically assures the carrier frequency synchronization of the receivers in the base stations.

This method has two notable disadvantages.

1. It is known, for example from [2], that signals transmitted via terrestrial radio channels are exposed to occurrences of so-called fading. The more narrow-banded the transmitted signal, the more detrimental the effects of these occurrences. Because a sinusoidal tone has an infinitely small bandwidth, such signals are impacted most severely by fading.
2. The sinusoidal tones of different base stations must have different frequencies, because otherwise they could mutually cancel each other out through destructive interference. Contrary to this requirement, however, is the desire for the sinusoidal tones of all base stations to have the same frequency so that certain diversity effects result for the mobile stations in carrier frequency synchronization.

SUMMARY OF THE INVENTION

The present invention is intended to provide a solution to the aforementioned contradiction so the occurrences of fading do not cause perceptible disturbances and lead to breakdowns or interruptions in synchronization in the mobile stations.

The method of the invention has the advantages that the same synchronization signal can be radiated in the base stations, resulting in a unified arrangement and equipment of the same, and that the synchronization of the mobile stations is assured because cancellations of the transmitted synchronization signals due to fading are not perceptibly disturbing. Unified circuits designed for identical frequencies can also be used in the mobile stations. These advantages prove useful when the following two conditions are met:

1. The synchronization signals should be broadband signals so they are affected less by fading than pure sinusoidal tones.
2. The synchronization signals should differ enough that they cannot cancel each other out directly, but, at the same time, they should be closely-enough matched in their essential features that all possible synchronization signals can be evaluated with the same receiver circuit; this means that a plurality of synchronization signals transmitted from different base stations and superimposed at the receiving site can be evaluated simultaneously.

DETAILED DESCRIPTION OF THE INVENTION

The present invention describes a method of carrier frequency synchronization supported by special synchronization signals, which avoids the above-described disadvantages and is distinguished by its particular simplicity. The synchronization signals used can be respectively interpreted as a group of 2L+1 (L=1, 2, 3, . . . ) sinusoidal tones whose frequency $f_1$ is a function of $$f_l = \frac{l}{2L+1} W,$$

$$l = 0, \pm 1, \ldots, \pm L$$

relative to a medium frequency $f_0$ (hereinafter also called carrier frequency). Here W is the bandwidth of the channel available for carrier frequency synchronization. Because such sinusoidal tone groups are broadband signals, they are not as strongly affected by the fading as an individual sinusoidal tone. Different base stations generate the sinusoidal tones at identical frequencies but different phases, that is, if $\phi_{il}$ is the phase of the lth sinusoidal tone of the ith base station, the following usually applies:

$$\phi_{il} - \phi_{ik} \neq \phi_{jl} - \phi_{jk}.$$

If, therefore, the respective lth sinusoidal tones of the base stations i and j eliminate one another because $\phi_{il} = -\phi_{jl}$, then $\phi_{ik} = -\phi_{jk}$ typically does not apply, i.e., the respective kth sinusoidal tones do not cancel one another out.

Moreover, a device (matched filter) with which carrier frequency synchronization can be performed efficiently is described further below, in Section "2. Algorithm for carrier frequency estimation."

Figure 1:
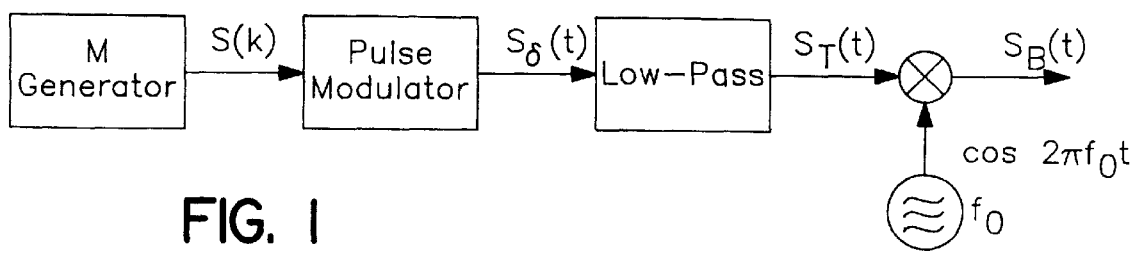
FIG. 1 illustrates an arrangement for generating a sinusoidal tone group according to the invention.

We assert that the arrangement (in a base station) illustrated in FIG. 1 generates a group of 2L+1 sinusoidal tones at the frequencies $$f_l = f_0 + \frac{l}{2L+1} W,$$

$$l = 0, \pm 1, \ldots, \pm L$$

where $f_0$ is the carrier frequency and the lth sinusoidal tone has the power of $$P_l = \begin{cases} \dfrac{1}{(2L+1)^2} P, & l = 0 \\ \dfrac{2L+2}{(2L+1)^2} P, & l \neq 0 \end{cases}$$

Here P is the total power of the signal. The M generator generates a maximum-periodic series of the period length (number of cycles) 2L+1, where $$2L+1 = 2^m - 1, \quad m = 2, 3, 4, \ldots$$

must apply as the boundary condition. Series of this type can be generated by feedback m-digit shift registers, in which instance the feedback can be represented by a primitive polynomial of $GF(2^m)$ (GF means Galois Field—see [3]). The maximum-periodic series here is defined such that its elements can only assume the values +1 and −1. (Alternatively, it could also be defined such that the elements assume the values 0 and 1.)

The maximum-periodic series is supplied to a so-called pulse modulator that generates a pulse function having the weight s(k) at a time t=k/W. The following therefore applies with the Dirac's function δ:

$$s_\delta(t) = \sum_{k=-\infty}^{+\infty} s(k)\delta(t - k/W).$$

This pulse function series is now supplied to a low-pass with the Dirac pulse response $h_s(t)$ or transmission function $$H_s(f) = \int_{-\infty}^{+\infty} h_s(t)e^{-j2\pi ft}dt$$

The output signal of this low-pass, then, is $$s_T(t) = \sum_{k=-\infty}^{+\infty} s(k)h_s(t - k/W).$$

Ideally, the low-pass should have the same amplification factor at the frequencies $$f_l = \frac{l}{2L+1} W,$$

$$l = 0, \pm 1, \ldots, \pm L$$

Moreover, a linear phase is desired, that is, the phase shift $\psi_l$ dictated by the filter at the frequency $f_1$ is a linear function in $f_l$ $$\psi_l = cf_l$$

where c is a constant. The third condition on the transmission function of the filter is $$H_s(f) = 0, \quad |f| \geq W/2.$$

Deviations from these conditions can be tolerated within certain limits.

The filtered signal is modulated to a carrier having the frequency $f_0$, and the transmission signal $$s_B(t) = s_T(t)\cos 2\pi f_0 t$$

is now a sinusoidal tone group having the frequencies $$f_l = f_0 + \frac{l}{2L+1} W,$$

$$l = 0, \pm 1, \ldots, \pm L.$$

In a mobile radio network, the individual base stations can generate the synchronization signals according to the same method, but each station uses a different feedback polynomial to generate the maximum-periodic series. The number of possible feedback polynomials is $e(2^m-1)/m$. where m is the number of shift register cells and e is the so-called Eulerian function [4]: if z is a natural number, e(z) is the number of natural numbers x, with $1 \leq x < z$, which are relatively prime to z. The limitedness of the number of possible feedback polynomials does not imply a limitedness of the total number of base stations. Base stations located far enough apart can readily use the same feedback polynomial.

The above-described method of generating a sinusoidal tone group is not totally optimal. Ideally, all of the sinusoidal tones should have the same power, which is not quite the case here (for large L, however, the deviations are negligible). Furthermore, the limited number of different feedback polynomials means a limitation in the signal design.

The advantages of this method lie in the simplicity of the generation of synchronization signals (with the aid of a maximum-periodic series—the sinusoidal tones of the group must not be generated individually) and the fact that the discrete-time signals s(k) in the base band have a constant amplitude. Consequently, the transmission signals (radiated synchronization signals) also have a virtually constant amplitude, which is desirable for numerous applications.

Figure 2:
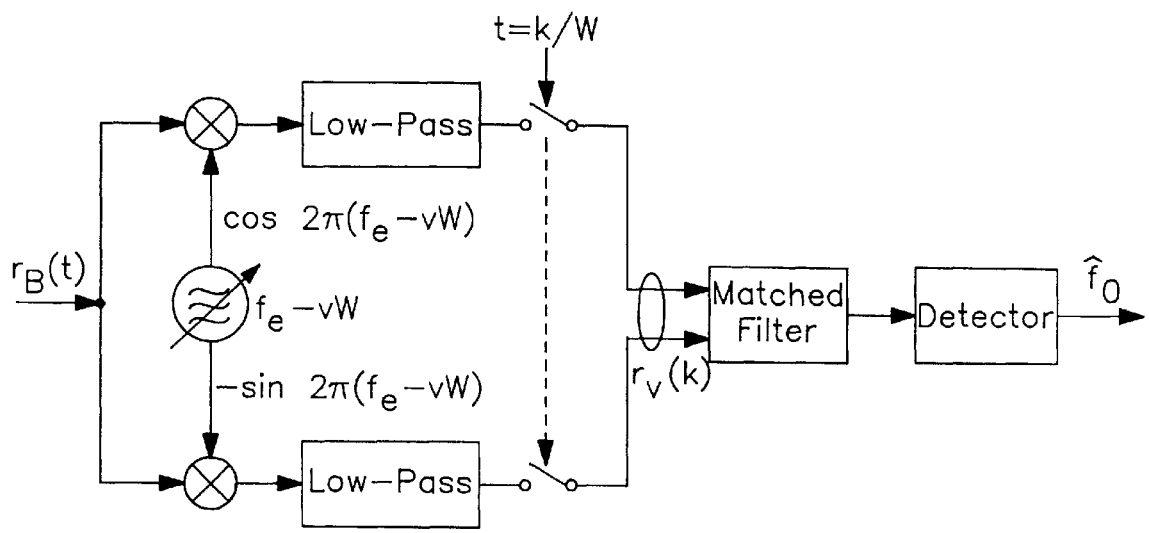
FIG. 2 shows an arrangement for determining the carrier frequency of a synchronization signal according to the invention.

FIG. 2 shows an arrangement that serves to determine the carrier frequency of the synchronization signal. In the mobile station, the reception signal $r_B(t)$ is converted into the base band with a variable quadrature demodulator. At the beginning of the synchronization process, $f_e$ is the oscillator frequency. This frequency is varied continuously during the synchronization process; v is the detuning normalized to the signal bandwidth W. The two quadrature components are respectively supplied to a low-pass, which is expected to meet the same requirements as the transmitter low-pass. It is assumed that the transmission signal $s_B(t)$ is linearly distorted during transmission, and is additionally disturbed by white Gaussian noise $n_B(t)$. The reception signal is therefore $$r_B(t) = h_c(t) * s_B(t) + n_B(t).$$

The linear distortions are therefore described as a folding of the transmission signal with the Dirac pulse response $h_c(t)$ of the channel.

The output signals of the low-passes are respectively scanned at the rate W; the scanning values are processed in a digital matched filter. The Dirac pulse response of this matched filter comprises N scanning values of any maximum-periodic series of the period length 2L+1, i.e., if s(k) is a maximum-periodic series of period length 2L+1, then $$h(k) = s(k), \quad k = 0 \ldots, N-1.$$

It must be taken into consideration that h(k) can be derived from any maximum-periodic series; it need not be the one used in the transmitter. The only condition is that the transmitter and receiver use a maximum-periodic series of the same period. In a mobile radio application, however, this means that the receiver of the mobile station automatically evaluates the synchronization signals of all receivable base stations. Because the Dirac pulse response coefficients of the channel that have been derived from the maximum-periodic series only assume the values of +1 and −1, the digital matched filter can be configured without a multiplier.

From 2L+1 sequential output values of the matched filter, the detector squares the amounts and adds them. A maximum results with detuning or at one of the frequencies $f_0$ set by the quadrature demodulator. This frequency is a nearly optimum maximum likelihood estimation value for the actual carrier frequency.

It is noted here that the arrangement shown in FIG. 2 can be used not only when the synchronization signals are generated according to the arrangement shown in FIG. 1, but whenever the synchronization signal is a group of sinusoidal tones having the frequencies $$f_l = f_0 + \frac{l}{2L+1} W,$$

$$l = 0, \pm 1, \ldots, \pm L,$$

where the number of sinusoidal tones must fulfill the condition $$2L+1 = 2^m - 1, \quad m = 1, 2 \ldots$$

Following is a detailed description of the invention and a demonstration of its functionality.

1. Generation of a sinusoidal tone group with the aid of maximal-periodic series A periodic series $\{s(k)\}$ is given. The period length is 2L+1, that is, $s(k+2L+1)=s(k)$. The interval between two scanning values is 1/W. The spectrum of this series therefore exclusively comprises lines at the frequencies $$f_l = \frac{l}{2L+1} W,$$

$$l = 0, \pm 1, \ldots, \pm L$$

having the amplitudes $$S_l = \frac{1}{2L+1} \sum_{k=0}^{2L} s(k) e^{-j2\pi \frac{kl}{2L+1}}.$$

The power of the lth spectral line is therefore $$P_l = |S_l|^2 = \frac{1}{(2L+1)^2} \sum_{k=0}^{2L} \sum_{k'=0}^{2L} s(k)s^*(k') e^{-j2\pi \frac{k-k'}{2L+1} l}$$

$$= \frac{1}{(2L+1)^2} \sum_{k=0}^{2L} \sum_{k'=0}^{2L} s(k)s^*(k-k') e^{-j2\pi \frac{kl}{2L+1}}$$

$$= \frac{1}{(2L+1)^2} \sum_{k'=0}^{2L} \phi_{ss}(k') e^{-j2\pi \frac{kl}{2L+1}},$$

where $$\phi_{ss}(k') = \sum_{k=0}^{2L} s(k)s^*(k-k').$$

If a maximum-periodic series is selected for $\{s(k)\}$, then [4] is $$\phi_{ss}(k') = (2L+2)\delta(k') - 1.$$

It follows that $$P_l = \frac{1}{(2L+1)^2} \sum_{k=0}^{2L} [(2L+2)\delta(k) - 1] e^{-j2\pi \frac{kl}{2L+1}}$$

$$= \frac{2L+2}{(2L+1)^2} - \frac{1}{(2L+1)^2} \sum_{k=0}^{2L} e^{-j2\pi \frac{kl}{2L+1}}$$

$$= \begin{cases} \frac{1}{(2L+1)^2}, & l = 0 \\ \frac{2L+2}{(2L+1)^2}, & l \neq 0 \end{cases}$$

Therefore, if $\{s(k)\}$ is a maximum-periodic series and 2L+1 is the period length, then these series has 2L spectral lines of identical power. Only the power of the line at f=0 is smaller by the factor 2L+2.

2. Algorithm for estimating the carrier frequency

The functionality of the arrangement shown in FIG. 2 is demonstrated in this paragraph. First, the optimum ML estimation algorithm is derived, which is essentially based on the ideas of Rife and Boorstyn [5], [6]. It will be shown subsequently how this algorithm can be structured particularly favorably as a matched filter. First, $f_c$ is the reception frequency set by the oscillator of the quadrature demodulator. The digital matched filter then sees a signal scanning series of the form $$r(k) = \sum_{l=-L}^{+L} a(l) e^{j2\pi \frac{kl}{2L+1}} e^{j2\pi \Delta f k} + n(k).$$

Here $\Delta f$ is the difference between the oscillators in the receivers and transmitters, which has been normalized to the signal bandwidth W, $$\Delta f = \frac{f_c - f_0}{W}$$

and a(l) is the (complex) amplitude of the lth sinusoidal tone. It must be considered here that this amplitude is not only a function of signal generation, but also of the Dirac pulse response of the channel and the time delay of the signal, and is therefore unknown to the receiver. Gaussian-distributed white noise is symbolized by n(k).

A maximum-likelihood (ML) formulation can be used as a synchronization formulation for simultaneously estimating $\Delta f$ and all a(l). If $\hat{v}$ is the ML estimation value for $\Delta f$ and $\hat{\alpha}$ (l) is the ML estimation value for a(l), according to the ML rule, $$\sum_{k=0}^{N-1} \left| r(k) - \sum_{l=-L}^{+L} \alpha(l) e^{j2\pi \frac{kl}{2L+1}} e^{j2\pi v k} \right|^2$$

is minimal for $\alpha(l) = \hat{\alpha}(l)$ and $v = \hat{v}$, or $$\sum_{k=0}^{N-1} \left[ Re \left\{ r(k) \sum_{l=-L}^{+L} \alpha^*(l) e^{-j2\pi \frac{kl}{2L+1}} e^{-j2\pi v k} \right\} - \frac{1}{2} \left| \sum_{l=-L}^{+L} \alpha(l) e^{j2\pi \frac{kl}{2L+1}} \right|^2 \right] \quad (1)$$

is maximal for the same choice. It was assumed here that a total of N scanning values of the received signals r(k) were evaluated. The second term is $$\frac{1}{2} \sum_{k=0}^{N-1} \left| \sum_{l=-L}^{+L} \alpha(l) e^{j2\pi \frac{kl}{2L+1}} \right|^2 =$$

$$\frac{1}{2} \sum_{k=0}^{N-1} \sum_{l=-L}^{+L} \sum_{l'=-L}^{+L} \alpha(l)\alpha^*(l') e^{j2\pi k \frac{l-l'}{2L+1}} =$$

$$\frac{1}{2} \sum_{l=-L}^{+L} \sum_{l'=-L}^{+L} \alpha(l)\alpha^*(l') \sum_{k=0}^{N-1} e^{j2\pi k \frac{l-l'}{2L+1}}.$$

If it is assumed that N is a whole multiple of 2L+1, then $$\sum_{k=0}^{N-1} e^{j2\pi k \frac{l-l'}{2L+1}} = N\delta(l-l').$$

It follows that $$\frac{1}{2} \sum_{k=0}^{N-1} \left| \sum_{l=-L}^{+L} \alpha(l) e^{j2\pi \frac{kl}{2L+1}} \right|^2 = \frac{N}{2} \sum_{l=-L}^{+L} |\alpha(l)|^2.$$

Therefore, from (1), $$Re\left\{ \sum_{k=0}^{N-1} r(k) \sum_{l=-L}^{+L} \alpha^*(l) e^{-j2\pi \frac{kl}{2L+1}} e^{-j2\pi vk} \right\} - \frac{N}{2} \sum_{l=-L}^{+L} |\alpha(l)|^2. \quad (2)$$

With the use of the abbreviation $$\lambda(f) = \sum_{k=0}^{N-1} r(k) e^{-j2\pi fk}$$

($\lambda(f)$ is the Fourier-transformed scanned input signal at the point f), and (2) can be written as $$\sum_{l=-L}^{+L} Re\left\{ \alpha^*(l) \lambda\left( \frac{l}{2L+1} + v \right) \right\} - \frac{N}{2} |\alpha(l)|^2. \quad (3)$$

With a simple variation calculation, it can now be shown that the relationship $$N\hat{\alpha}(l) = \lambda\left( \frac{l}{2L+1} + \hat{v} \right)$$

applies for the maximum points of this expression. If this relationship is used in (3), it can be seen that the maximum of the expression (3) can be written thus:

$$\sum_{l=-L}^{+L} \left| \lambda\left( \frac{l}{2L+1} + \hat{v} \right) \right|^2 = \sum_{l=-L}^{+L} \left| \sum_{k=0}^{N-1} r(k) e^{-j2\pi \hat{v}k} e^{-j2\pi \frac{kl}{2L+1}} \right|^2$$

$$= \sum_{l=-L}^{+L} \left| \sum_{k=0}^{N-1} r_v(k) e^{-j2\pi \frac{kl}{2L+1}} \right|^2$$

In this case, generally $$r_v(k) = r(k)_{92}^{-j2\pi vk}$$

Here $Y_v(f)$ can be generated, for example, by detuning the carrier oscillator by $-vW$.

Figure 3:
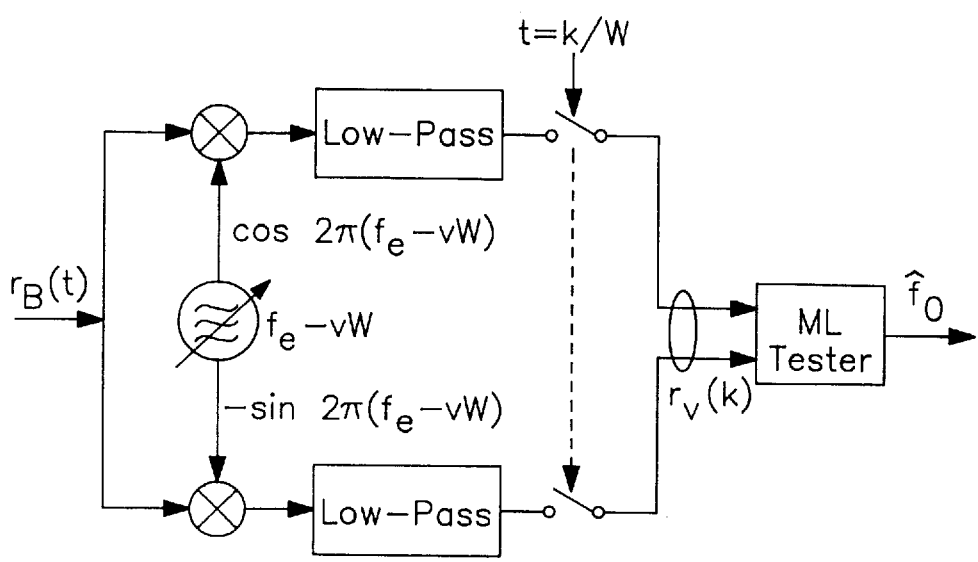
FIG. 3 shows another arrangement for determining the carrier frequency of a synchronization signal according to the invention.

The ML algorithm derived for determining a suitable estimation value $\hat{v}$ for the carrier frequency offset $\Delta f$ can be realized by the arrangement illustrated in FIG. 3. Up to the post-scanning components, the arrangement corresponds to the arrangement shown in FIG. 2. The oscillator of the quadrature demodulator is detuned by $-vW$; the scanned received signal is then $Y_v(k)$. From this, the ML tester then calculates the value $$\sum_{l=-L}^{+L} \left| \sum_{k=0}^{N-1} r_v(k) e^{-j2\pi \frac{kl}{2L+1}} \right|^2.$$

The detuning for which the highest value results corresponds to the optimum estimation value for the carrier frequency error, i.e., during this detuning the receiving oscillator is optimally synchronized to the carrier frequency in the sense of the ML rule.

To bring to a close the demonstration of the functionality of the arrangement shown in FIG. 2, it only remains to be shown that the relatively complicated block ML test can be replaced by the matched filter described in Section 2. The values $$\lambda\left( \frac{l}{2L+1} + v \right) = \sum_{k=0}^{N-1} r_v(k) e^{-j2\pi \frac{kl}{2L+1}}, \quad l = -L, \ldots, +L,$$

can be generated by supplying $r_v(k)$ to a bank of 2L+1 filters with the Dirac pulse responses $$h_l(-k) = e^{j2\pi \frac{kl}{2L+1}}, \quad k = 0, \ldots, N-1,$$

and taking the output value at the time k=0. If $g_l(n)$ is the output signal of the lth filter at time n, then $$g_l(0) = \lambda\left( \frac{l}{2L+1} + v \right).$$

The ML tester therefore calculates $$\sum_{l=-L}^{+L} |g_l(0)|^2,$$

that is, it squares the output values of the 2L+1 filters at time 0 and adds them. If N is large compared to 2L+1, then the following applies with good precision for $n=0, \ldots, 2L$ $$\begin{aligned}
g_l(n) &= \sum_{k=0}^{N-1} r_v(n+k) e^{-j2\pi \frac{kl}{2L+1}} \\
&\approx \sum_{k=0}^{N-1} r_v(k) e^{-j2\pi \frac{k-n}{2L+1} l} \\
&= e^{j2\pi \frac{nl}{2L+1}} \sum_{k=0}^{N-1} r_v(k) e^{-j2\pi \frac{kl}{2L+1}} \\
&= e^{j2\pi \frac{nl}{2L+1}} g_l(0).
\end{aligned}$$

Therefore,

-continued $$\left| \sum_{k=0}^{2L} \sum_{l=-L}^{+L} g_l(k) \right|^2 = \sum_{k=0}^{2L} \sum_{l=-L}^{+L} \sum_{l'=-L}^{+L} g_l(k) g_{l'}^*(k)$$

$$\approx \sum_{k=0}^{2L} \sum_{l=-L}^{+L} \sum_{l'=-L}^{+L} g_l(0) e^{j2\pi \frac{kl}{2L+1}} g_{l'}^*(0) e^{-j2\pi \frac{kl'}{2L+1}}$$

$$= \sum_{l=-L}^{+L} \sum_{l'=-L}^{+L} g_l(0) g_{l'}^*(0) \sum_{k=0}^{2L} e^{j2\pi \frac{l-l'}{2L+1} k}$$

$$= (2L+1) \sum_{l=-L}^{+L} \sum_{l'=-L}^{+L} g_l(0) g_{l'}^*(0) \delta(l-l')$$

$$= (2L+1) \sum_{l=-L}^{+L} |g_l(0)|^2.$$

This conversion allows the use of a simple filter having the Dirac pulse response of $$h(k) = \sum_{l=-L}^{+L} h_l(k) = \sum_{l=-L}^{+L} e^{-j2\pi \frac{kl}{2L+1}}, \quad k = 0, \ldots, -N+1$$

instead of the above filter bank. Points of interest here are not only the filter output value at time k=0, but also 2L+1 sequential filter output values. These values are squared and added.

Because the phases of the individual partial oscillations are insignificant, only one filter is required whose transmission function comprises 2L+1 same-magnitude lines at the points f=1W/(2L+1), 1=-L, . . . ,+L. The Dirac pulse response of this type of filter can be realized with good approximation in that N scanning values of a maximum-periodic series of period length 2L+1 are taken. As shown in the last section, a filter having such a Dirac pulse response has the desired transmission function, except at the point f=0.

Literature

[1] CEPT/CCH/GSM Recommendation 05.02: Multiplexing and Multiple Access on the Radio Path, 1988.
[2] J. G. Proakis, Digital Communications, McGraw-Hill, 1983.
[3] W. W. Peterson, Error-Correction Codes, MIT Press, 1972.
[4] J. K. Holmes, Coherent Spread Spectrum Systems, John Wiley
[5] D. C. Rife, R. R. Boorstyn, "Single-Tone Parameter Estimation from Discrete-Time Observations," IEEE Transactions on Information Theory, vol. IT-20, pp. 591–598, 1974.
[6] D. C. Rife, R. R. Boorstyn, "Multiple Tone Parameter Estimation from Discrete-Time Observations," Bell System Technical Journal, vol. 55, pp. 1389–1410, Nov. 1976. John Wiley & Sons, 1982.

I claim:

1. A method for carrier frequency synchronization combining the step of transmitting a synchronization signal from base stations of a mobile radio network, said signal being used by mobile stations at the mobile radio network to synchronize the carrier frequency of their receivers, wherein the synchronization signal is a combination of a group of $2^m-1$ sinusoidal oscillations of different frequencies, where m=2, 3, 4, . . . , and the group encompasses a number 2L+1 of sinusoidal oscillations, where L=1, 2, 3, . . . , and these sinusoidal oscillations have virtually the same power, and the synchronization signal has a virtually constant amplitude.

2. A method of synchronizing the carrier frequencies of mobile stations in a mobile radio network having base stations and mobile stations, said method comprising the steps of: transmitting a synchronization signal from each base station; receiving the synchronization signal at the mobile stations, said synchronization signal being used to derive the transmitting frequency, wherein the synchronization signal is a group of $2^m-1$ simultaneously-transmitted sinusoidal oscillations having different frequencies, where m=2, 3, 4, . . . , and the group encompasses a number 2L+1 of sinusoidal oscillations, where L=1, 2, 3, . . . , and finding and detecting at least one of the sinusoidal oscillations with a matched filter of one of the respective mobile stations so that the transmitting frequency can be derived as the synchronization frequency.

3. Method according to claim 1, wherein the frequencies of the sinusoidal oscillations are equidistant.

4. Method according to claim 3, wherein the sinusoidal oscillations have the frequencies $f_1=f_0+W \cdot 1/(2L+1)$, where l=0, ±1, . . . ,±L, wherein W is the bandwidth of the channel available for carrier frequency synchronization, and $f_0$ is the medium frequency of this channel.

5. Method according to claim 4, wherein the group of sinusoidal oscillations is generated by the modulation of an oscillation of the aforementioned medium frequency $f_0$.

6. Method according to claim 1, wherein the groups emitted by different base stations contain the same sinusoidal oscillations, but with different phase positions.

7. Method according to claim 6, wherein, in different base stations, the groups having the same medium frequency $f_0$ are respectively formed from a maximum-periodic series of unified period length 2L+1, but with different sequences.

8. Method according to claim 2, wherein frequencies of the sinusoidal oscillations are equidistant.

9. Method according to claim 8, wherein the sinusoidal oscillations have the frequencies $f_1=f_0+W \cdot 1/(2L+1)$, where l=0, ±1, . . . , ±L, wherein W is the bandwidth of the channel available for carrier frequency synchronization, and $f_0$ is the medium frequency of this channel.

10. Method according to claim 9, wherein the group of sinusoidal oscillations is generated by the modulation of an oscillation of the aforementioned medium frequency $f_0$.

11. Method according to claim 2, wherein the groups emitted by different base stations contain the same sinusoidal oscillations, but with different phase positions.

12. Method according to claim 11, wherein, in different base stations, the groups having the same medium frequency $f_0$ are respectively formed from a maximum-periodic series of unified period length 2L+1, but with different sequences.

13. A method of synchronizing the carrier frequency of a mobile station in a mobile radio network comprising the steps of:

transmitting a synchronization signal that is a combination of a group of 2L+1 sinusoidal oscillations, where L=1, 2, 3, . . . , and the number of sinusoidal oscillations is equal to $2^m-1$, where m=2, 3, 4, . . . ;

receiving and transforming a synchronization signal into a base band by means of a quadrature demodulator;

scanning and supplying the transformed synchronization signal to a matched filter of the mobile station;

processing the scanned, transformed synchronization signal to produce a Dirac pulse response of the matched filter that is an arbitrary maximum-periodic series of the length 2L +1; and supplying the output signal of the matched filter to a detector which squares and adds 2L+1 signal values, and if the sum is a maximum, sets the frequency as the synchronization carrier frequency.

* * * * *